(12) United States Patent
Tsai

(10) Patent No.: US 11,741,584 B2
(45) Date of Patent: Aug. 29, 2023

(54) METHOD FOR CORRECTING AN IMAGE AND DEVICE THEREOF

(71) Applicant: GENESYS LOGIC, INC., New Taipei (TW)

(72) Inventor: Mi-lai Tsai, New Taipei (TW)

(73) Assignee: GENESYS LOGIC, INC., New Taipei (TW)

(*) Notice: Subject to any disclaimer, the term of this patent is extended or adjusted under 35 U.S.C. 154(b) by 79 days.

(21) Appl. No.: 16/682,067

(22) Filed: Nov. 13, 2019

(65) Prior Publication Data

US 2020/0175657 A1 Jun. 4, 2020

Related U.S. Application Data

(60) Provisional application No. 62/760,057, filed on Nov. 13, 2018.

(51) Int. Cl.
*G06T 5/00* (2006.01)
*G06T 7/80* (2017.01)
*G06T 5/50* (2006.01)

(52) U.S. Cl.
CPC .............. *G06T 5/006* (2013.01); *G06T 5/50* (2013.01); *G06T 7/80* (2017.01)

(58) Field of Classification Search
CPC .......... G06T 5/00; G06T 5/006; G06T 5/001; G06T 5/50; G06T 7/80; G06T 7/85; G06T 7/73; G06T 7/74; G06T 7/70; G06T 7/97
USPC ................................. 382/275, 298, 151, 209
See application file for complete search history.

(56) References Cited

U.S. PATENT DOCUMENTS

| | | | | |
|---|---|---|---|---|
| 7,470,029 B2* | 12/2008 | Kobayashi | ............... | H04N 5/74 348/745 |
| 8,126,111 B2* | 2/2012 | Uhde | ..................... | A61B 6/547 378/41 |
| 8,350,929 B2* | 1/2013 | Tsurumi | ................. | H04N 9/804 348/239 |
| 8,768,094 B2* | 7/2014 | Bassi | .................... | H04N 9/3194 382/275 |
| 9,536,362 B2* | 1/2017 | Sarwar | ................ | H04N 13/243 |

(Continued)

FOREIGN PATENT DOCUMENTS

| | | | | |
|---|---|---|---|---|
| EP | 3113710 B1 * | 10/2018 | .......... | G06T 7/0014 |
| TW | 200528945 A | 9/2005 | | |

(Continued)

OTHER PUBLICATIONS

D. M. Gavrila, "Multi-feature hierarchical template matching using distance transforms," Proceedings. Fourteenth International Conference on Pattern Recognition (Cat. No. 98EX170), Brisbane, QLD, Australia, 1998, pp. 439-444 vol. 1, doi: 10.1109/ICPR.1998. 711175. (Year: 1998).*

*Primary Examiner* — Leon Viet Q Nguyen
(74) *Attorney, Agent, or Firm* — Andrew M. Calderon; Calderon Safran & Cole, P.C.

(57) ABSTRACT

A method for correcting distorted image and apparatus thereof are provided. In the method, an image device acquires a first pattern image and a controller generates a relationship table between the first pattern image and an original pattern image. The image device acquires a second pattern image. The controller corrects each pixel content of the second pattern image based on the relationship table to create a correction image corresponding to the second pattern image.

10 Claims, 9 Drawing Sheets

(56) References Cited

U.S. PATENT DOCUMENTS

| | | | | |
|---|---|---|---|---|
| 9,968,845 | B2* | 5/2018 | Tsurumi | A63F 13/533 |
| 10,262,400 | B2* | 4/2019 | Chen | H04N 25/61 |
| 10,498,962 | B2 | 12/2019 | Iso et al. | |
| 2010/0201809 | A1* | 8/2010 | Oyama | G01C 25/00 |
| | | | | 348/188 |
| 2012/0075432 | A1* | 3/2012 | Bilbrey | H04N 13/25 |
| | | | | 348/48 |
| 2012/0075473 | A1* | 3/2012 | Sarwar | G01J 4/00 |
| | | | | 348/156 |
| 2014/0247361 | A1* | 9/2014 | Sarwar | G06K 9/00255 |
| | | | | 348/156 |
| 2015/0049220 | A1* | 2/2015 | Kuwata | G06T 3/0062 |
| | | | | 348/240.99 |
| 2017/0309002 | A1* | 10/2017 | Koyano | G03B 17/14 |
| 2018/0084239 | A1* | 3/2018 | Muller | H04N 13/189 |
| 2019/0102868 | A1* | 4/2019 | Beric | G06T 3/0018 |

FOREIGN PATENT DOCUMENTS

| | | |
|---|---|---|
| TW | 201230773 A | 7/2012 |
| WO | 2017014071 A1 | 1/2017 |

* cited by examiner

METHOD FOR CORRECTING AN IMAGE AND DEVICE THEREOF

FIELD OF INVENTION

The present invention relates to a method for correcting an image and a device thereof, especially to a method for correcting a distorted image and a device thereof.

BACKGROUND OF INVENTION

In the prior art, cameras employing a wide-angle lens or a fisheye lens to capture images of wide viewing angles cause curve of edges of the image and unnatural appearance of the image. An wide-angle image or a fisheye image is usually used for image display of a rearview mirror, an internet protocol (IP) cameras, a monitor system, an internet of things (IOT) camera, a visual machine, etc. In an image system of such electronic devices, distorted image results in difficulty of recognizing an image content and uncomfortableness of a user's eyes. Because an application of analysis of images is adapted for non-distorted images, before an image analyzing method is implemented, it is necessary to correct the distorted image to lower the distortion degree of the distorted image to facilitate later applications. In the prior art, existing cameras with a wide-angle lens or a fisheye lens need complicated hardware or software, which results in higher costs. As such, it is required to develop a novel method for correcting an image and a device thereof to solve the above issue.

SUMMARY OF INVENTION

One of objectives of the present invention is to provide a method for correcting an image and a device thereof that simply and effectively correct distorted images and lower a cost by a controller.

To achieve the above objective, the method for correcting an image in the embodiment of the present invention comprises: acquiring a first image from a reference target by an image device, wherein the reference target comprises a plurality of reference points and a calibration datum point, the image device comprises a lens and a sensor, the sensor comprises a plurality of pixels, and the reference target projects an image to the sensor through the lens;

identifying the reference points on the reference target and the calibration datum point in the first image by a controller, and calculating out a distance between each of the reference points in the first image and the calibration datum point and an expansion/compression ratio of each of the reference points by the controller;

establishing a position-ratio relation chart between the first image and the reference target according to the expansion/compression ratio of each of the reference points; and acquiring a second image from a target by the image device, and reading pixel data of the second image of a corresponding position on the sensor according to an image pixel queue to form a correction image data, wherein the corresponding position is acquired by calculation employing the position-ratio relation chart.

In the method for correcting a captured image of the embodiment, wherein the reference target comprises a set of orthogonal scales.

In the method for correcting a captured image of the embodiment, wherein the reference target comprises a scale, the scale comprises a horizontal included angle, and the horizontal included angle is from 20° to 70°.

In the method for correcting a captured image of the embodiment, wherein the image device comprises an optical axial center, in the step of acquiring the first image from the reference target by the image device, the optical axial center coincides with the calibration datum point.

In the method for correcting a captured image of the embodiment, wherein the reference target comprises a first pattern and a second pattern intersecting the first pattern.

In the method for correcting a captured image of the embodiment, wherein the reference target is a checkerboard.

In the method for correcting a captured image of the embodiment, wherein the first pattern is a horizontal scale, and the second pattern is a vertical scale.

In the method for correcting a captured image of the embodiment, wherein the vertical scale intersects the horizontal scale orthogonally.

In the method for correcting a captured image of the embodiment, wherein when the step of calculating out the distance between each of the reference points and the calibration datum point in the first image and the expansion/compression ratio of each of the reference points by the controller, further comprises:

calculating the expansion/compression ratio between the first image and the reference target along a horizontal direction and the expansion/compression ratio between the first image and the reference target along a vertical direction by the controller.

In the method for correcting a captured image of the embodiment, wherein the step of establishing the position-ratio relation chart between the first image and the reference target according to the expansion/compression ratio of each of the reference points, further comprises:

establishing a horizontal direction position-ratio relation chart between the first image and the reference target according to the expansion/compression ratio along the horizontal direction by the controller, and establishing a vertical direction position-ratio relation chart between the first image and the reference target according to the expansion/compression ratio along the vertical direction by the controller.

The image correction device of the embodiment of the present invention comprises:

an image device comprising a lens and a sensor, the sensor comprising a plurality of pixels, and the image device comprising an optical axial center; and a controller comprising a calculation unit and a memory unit;

wherein when the image device is in a calibration mode, the image device is configured to acquire a reference target to form a first image, the reference target comprises a plurality of reference points and a calibration datum point, a predetermined distance is defined between each of the reference points and the calibration datum point, and the controller is configured to calculate out an expansion/compression ratio between the first image and the reference target and establish a position-ratio relation chart between the first image and the reference target according to the expansion/compression ratio;

wherein when the image device is in a correction mode, the image device is configured to acquire a second image from a target, the controller is configured to acquire an image content of each of pixel positions of the second image according to an image pixel queue and calculate the expansion/compression ratio of the image content of each of the pixel positions according to the position-ratio relation chart to establish a correction image of the second image.

In the image correction device of an embodiment, wherein calculation of the expansion/compression ratio comprises calculating a calibration distance between each of the reference points of the first image and the calibration datum point, and then calculating out the expansion/compression ratio according to the calibration distance and the predetermined distance.

In the image correction device of an embodiment, the reference target comprises a set of orthogonal scales.

In the image correction device of an embodiment, the reference target comprises a scale, the scale comprises a horizontal included angle, and the horizontal included angle is from 20° to 70°.

In the image correction device of an embodiment, when the image device acquires the first image from the reference target, the optical axial center coincides with the calibration datum point.

In the image correction device of an embodiment, the reference target comprises a first pattern and a second pattern intersecting the first pattern.

In the image correction device of an embodiment, the reference target is a checkerboard.

In the image correction device of an embodiment, the first pattern is a horizontal scale, and the second pattern is a vertical scale.

In the image correction device of an embodiment, the vertical scale intersects the horizontal scale orthogonally.

In the image correction device of an embodiment, when the controller calculates out the distance between each of the reference points and the calibration datum point in the first image and the expansion/compression ratio of each of the reference points, the controller calculates the expansion/compression ratio between the first image and the reference target along a horizontal direction and the expansion/compression ratio between the first image and the reference target along a vertical direction.

In the image correction device of an embodiment, when the controller establishes the position-ratio relation chart between the first image and the reference target according to the expansion/compression ratio of each of the reference points, the controller establishes a horizontal direction position-ratio relation chart between the first image and the reference target according to the expansion/compression ratio along the horizontal direction by the controller, and establishes a vertical direction position-ratio relation chart between the first image and the reference target according to the expansion/compression ratio along the vertical direction.

DESCRIPTION OF DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may acquire other figures according to the appended figures without any creative effort.

DETAILED DESCRIPTION OF PREFERRED EMBODIMENTS

Figure 1:
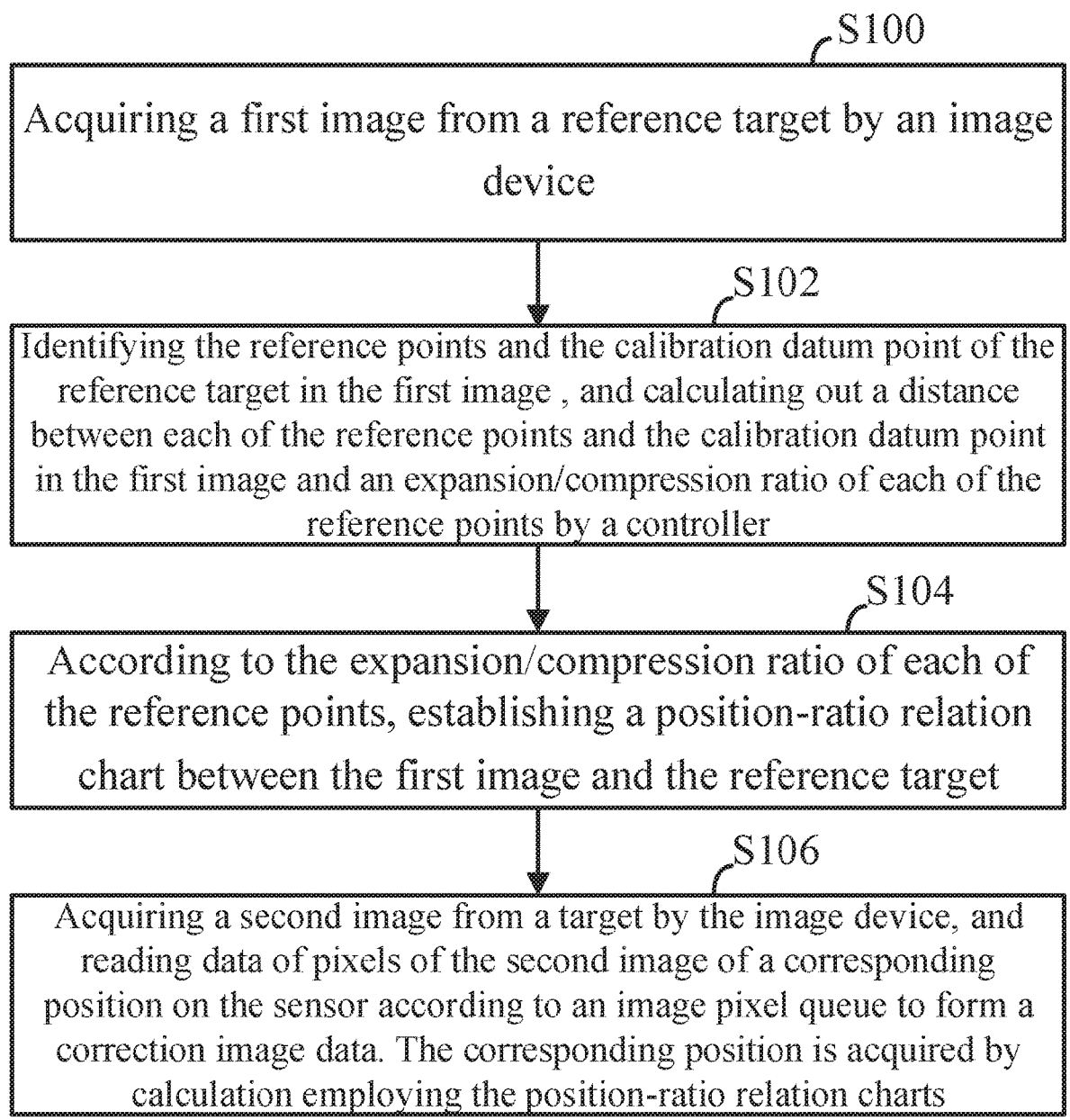
FIG. 1 depicts a flowchart of the method for correcting an image in the embodiment of the present invention.

With reference the figures, the same reference characters refer to the same elements or similar elements. A principle of the present invention are explained under examples in an appropriate environment. The following explanation is based on exemplary specific embodiments of the present invention, and should not be deemed as limitations to other embodiments of the present invention not described in detail herein.

Figure 2:
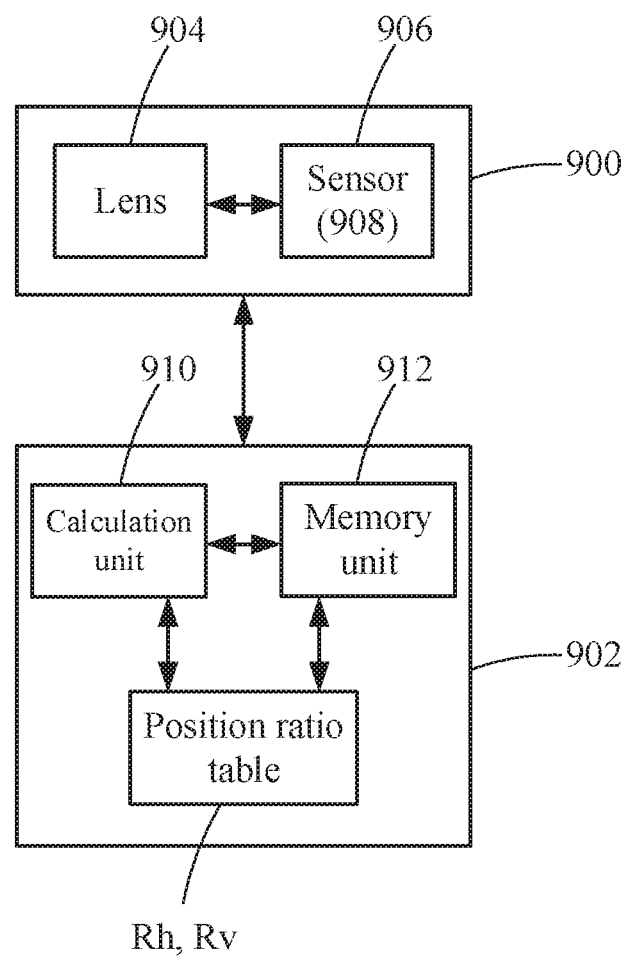
FIG. 2 depicts a block diagram of a image correction device of the embodiment of the present invention.
Figure 3A:
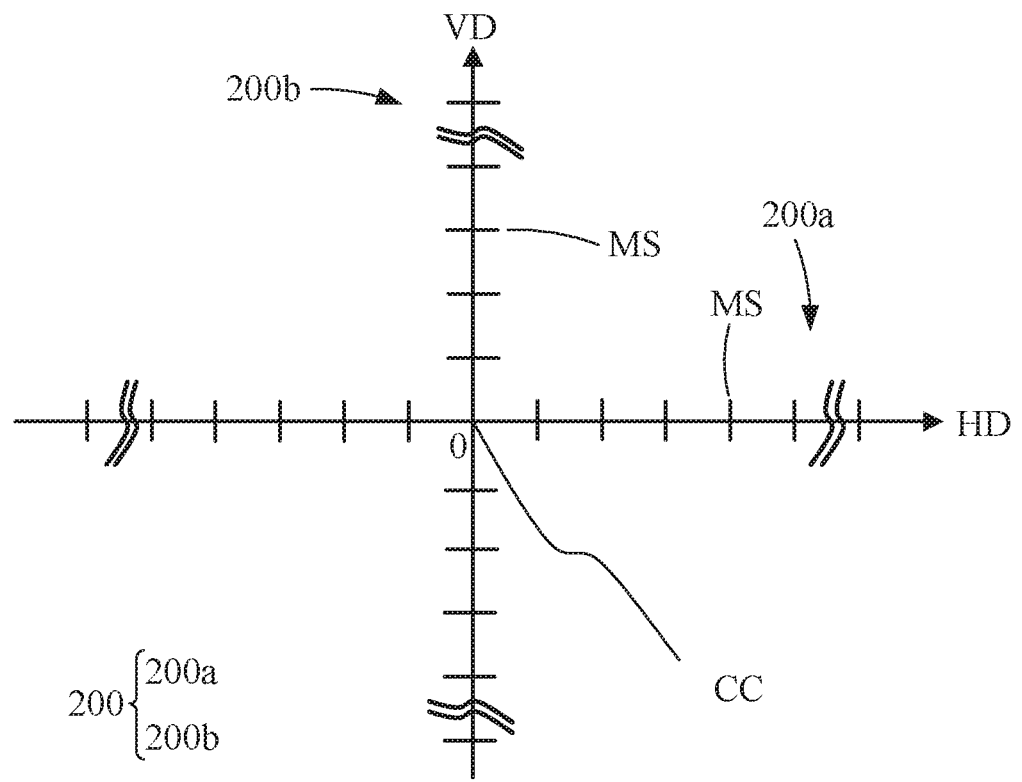
FIG. 3A depicts a schematic view of a reference target including reference points of the embodiment of the present invention.
Figure 3B:
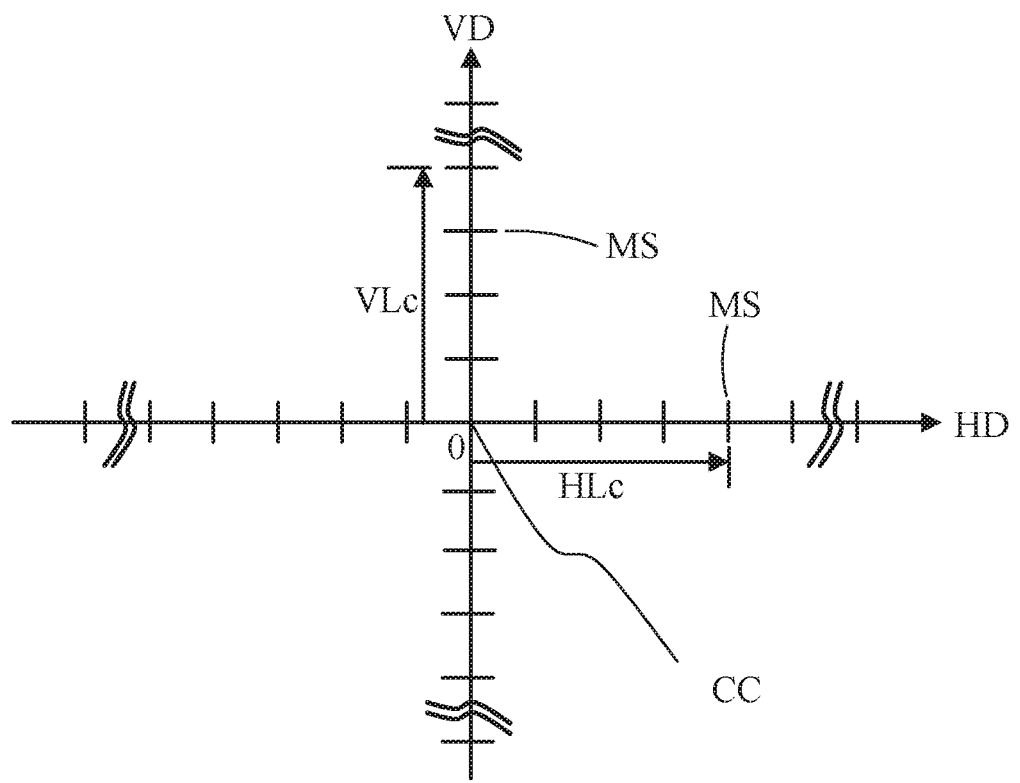
FIG. 3B depicts a schematic view of the reference target including the reference points of the embodiment of the present invention, and a predetermined distance is defined between each of the reference points and a calibration datum point.
Figure 4:
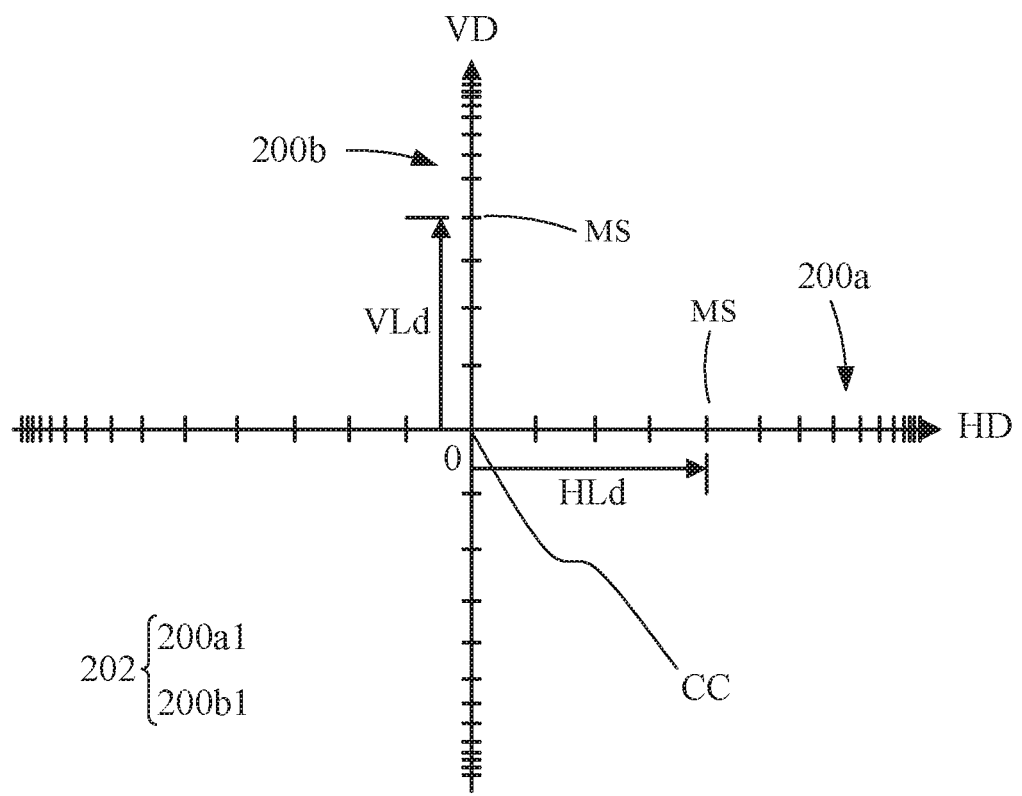
FIG. 4 depicts a schematic view of a first image of the reference target in FIG. 3A of the embodiment of the present invention.
Figure 5:
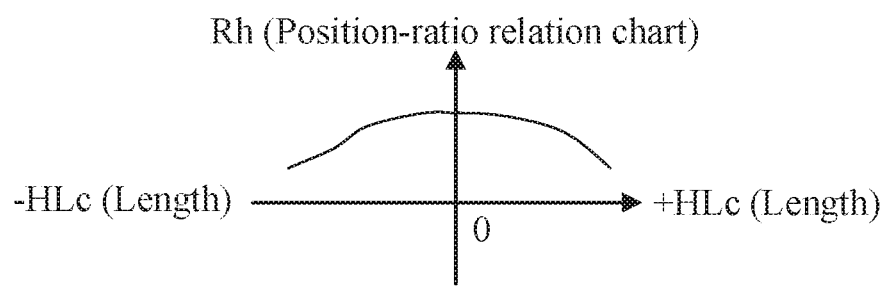
FIG. 5 depicts a position-ratio relation chart between the reference target and a corresponding position of the first image along a horizontal direction the embodiment of the present invention.
Figure 6:
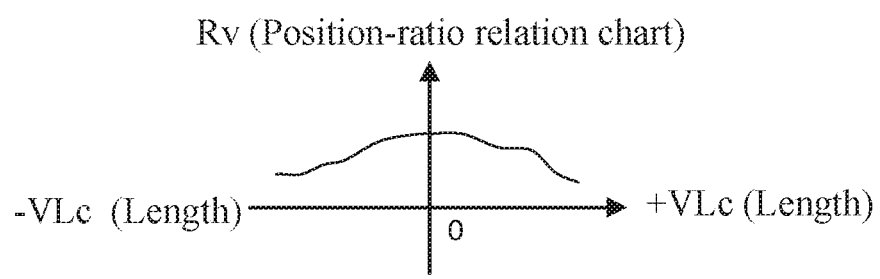
FIG. 6 depicts a position-ratio relation chart between the reference target and a corresponding position of the first image along a vertical direction the embodiment of the present invention.

With reference to FIGS. 1 to 6, FIG. 1 depicts a flowchart of the method for correcting an image in the embodiment of the present invention. FIG. 2 depicts a block diagram of a image correction device of the embodiment of the present invention. FIG. 3A depicts a schematic view of a reference target including reference points of the embodiment of the present invention. FIG. 3B depicts a schematic view of the reference target including the reference points (also referred as object reference points) of the embodiment of the present invention, and a predetermined distance (also referred as a predetermined length) is defined between each of the reference points (also referred as the object reference points of the reference target) and a calibration datum point (also referred as a calibration datum point of the reference target). FIG. 4 depicts a schematic view of a first image of the reference target in FIG. 3A of the embodiment of the present invention. FIG. 5 depicts a position-ratio relation chart between the reference target and a corresponding position of the first image along a horizontal direction the embodiment of the present invention. FIG. 6 depicts a position-ratio relation chart between the reference target and a corresponding position of the first image along a vertical direction the embodiment of the present invention. The correcting method and the device thereof of the present invention is adapted for a symmetrical and asymmetrical wide-angle lens or a fisheye lens. The symmetrical lens comprises a symmetrical distortion characteristic relative to an optical axis of the lens, and the asymmetrical lens comprises an asymmetrical distortion characteristic relative to the optical axis of the lens. The correcting method and the device thereof of the present invention can be achieved by use of software programs or hardware components. In FIG. 2, image correction device comprises an image device 900 and a controller 902. The image device comprises a lens 904 and a sensor 906. The sensor 904 comprises a plurality of pixels 908. The image device 900 comprises an optical axial center. The controller 902 comprises a calculation unit 910 and a memory unit 912.

The step S100, in an embodiment, comprises acquiring a first image 202 from a reference target 200 by an image device 900. The reference target 200 comprises a plurality of reference points MS (also referred as plurality of object reference points) and a calibration datum point CC. The image device 900 comprises a lens 904 and a sensor 906. The sensor 906 comprises a plurality of pixels 908. The reference target 200 projects an image through the lens 904 to the sensor 906. In an embodiment, the reference target 200 comprises a set of orthogonal scales. The reference target 200 comprises a scale, the scale comprises a horizontal included angle, the horizontal included angle is from 20° to 70°. For example, the scale can have a horizontal included angle of 45°. The image device 900 comprises an optical axial center, when the first image 202 is acquired from the reference target 200 by the image device 900, the optical axial center coincides with the calibration datum point CC. The first pattern 200a comprising a plurality of reference points MS is formed along a horizontal direction HD, and the second pattern 200b comprising a plurality of reference points MS is formed along a vertical direction VD. An intersecting position between the first pattern 200a and the second pattern 200b is defined as a calibration center CC, as shown in FIGS. 1 and 3A. The reference target 200 comprises the first pattern 200a and the second pattern 200b. The reference target 200 is a target acquired by an image device 900 (as shown in FIG. 2) by a wide-angle lens or a fisheye lens. In another embodiment, each of the first pattern 200a and the second pattern 200b the reference target 200 can be a grid pattern to form a checkerboard-like grid pattern, and each grid thereof comprises a predetermined dimension. In an embodiment. The first pattern 200a is a horizontal scale, and the second pattern 200b is a vertical scale. The vertical scale intersects the horizontal scale orthogonally.

The step 8102 comprises identifying the reference points M8 and the calibration datum point CC of the reference target 200 in the first image 202 also referred (also referred as the image reference points and the calibration center of the first image 202, respectively), and calculating out a distance between each of the reference points M8 and the calibration datum point CC in the first image 202 (also referred as a length between each of the image reference points and the calibration center of the first image 202) and an expansion/compression ratio of each of the reference points M8 by a controller 902. The step of calculating out the distance between each of the reference points M8 and the calibration datum point CC in the first image 202 and the expansion/compression ratio of each of the reference points M8 by the controller 902, further comprises: calculating the expansion/compression ratio between the first image 202 and the reference target 200 along a horizontal direction HD and the expansion/compression ratio between the first image 202 and the reference target 200 along a vertical direction VD by the controller 902. In an embodiment of the step 8102, the first pattern 200a and the second pattern 200b of the reference target 200 are acquired by an image device 900 to form the first image 202, and the first image 202 comprises a first distorted pattern image 200a1 and a second distorted pattern image 200b1 that intersect each other, the distorted reference target image 202 comprises the calibration center CC. For example, original pattern images of the first pattern 200a and second pattern 200b of FIG. 3A are acquired by a wide-angle lens or a fisheye lens, as shown in FIGS. 1 and 4. In another embodiment, the first image 202 can be a distorted grid pattern distorted image to form a distorted image with a checkerboard-like grid pattern.

The step S104 comprises according to the expansion/compression ratio of each of the reference points MS, establishing a position-ratio relation chart Rh, Rv between the first image 202 and the reference target 200. The step of establishing the position-ratio relation chart Rh, Rv between the first image 202 and the reference target 200 according to the expansion/compression ratio of each of the reference points MS by the controller 902, further comprises: establishing a horizontal direction position-ratio relation chart between the first image 202 and the reference target 200 according to the expansion/compression ratio along the horizontal direction HD by the controller 902, and establishing a vertical direction position-ratio relation chart between the first image 202 and the reference target 200 according to the expansion/compression ratio along the vertical direction VD by the controller 902.

In the step S104, a length between each of the reference points MS in the first image 202 and the calibration center CC is measured by the controller 902, as shown in FIGS. 1 and 4. In an embodiment, a length HLd (also referred as a first calibration length) between each of the reference points MS of the first image 202 (also referred as the image reference points of the first image 202) and the calibration center CC (also referred as the calibration center of the first image 202) along the horizontal direction HD and a length VLd (also referred as a second calibration length) between each of the reference points MS of the first image 202 (also referred as the image reference points of the first image 202) and the calibration center CC (also referred as the calibration center of the first image 202) along the vertical direction VD are measured. The length HLd is a distance between a distorted reference point MS along the horizontal direction HD and the calibration center CC, and the length VLd is a distance between a distorted reference point MS along the vertical direction VD and calibration center CC.

In the step S104, the expansion/compression ratio between the first image 202 and the reference target 200 along the horizontal direction HD and the expansion/compression ratio between the first image 202 and the reference target 200 along the vertical direction VD are calculated by a controller 902, as shown in FIGS. 1 and 3B. In an embodiment, a length HLc (also referred as a first predetermined length) is a distance between a corresponding reference point MS of the reference target 200 (also referred as the object reference points of the reference target 200) along the horizontal direction HD and the calibration center CC (also referred as the calibration datum point of the reference target 200), and a length VLc (also referred as a second predetermined length) is a distance between a corresponding reference point MS of the reference target 200 (also referred a the object reference points of the reference target 200) along the vertical direction VD and the calibration center CC (also referred as the calibration datum point of the reference target 200). The lengths HLc, VLc are defined according to the reference points of the reference target 200 and a resolution.

The controller 902 establishes ratio charts Rh, Rv between the reference points MS of the first image 202 and corresponding positions of the reference target 200 according to the expansion/compression ratios of the horizontal direction HD and the vertical direction VD. In an embodiment, the ratio charts Rh, Rv are indicated by curves, as shown in FIGS. 5 and 6, and definitions are as follows: Rh=HLd/HLc refers to a ratio of HLd and HLc along the horizontal direction, and Rv=VLd/VLc refers to a ratio of VLd and VLc along the vertical direction. In another embodiment, the ratio charts Rh, Rv are indicated in a form of databases. Under a circumstance that the ratio is greater than 1, the distance between the reference point and calibration center CC is expanded, and under a circumstance that the ratio is less than 1, the distance between the reference point and the calibration center CC is compressed. In an embodiment, as shown in FIG. 5, a corresponding relation ratio of Rh and HLc is along the horizontal direction, +HLc and −HLc can be a ratio table separated by the calibration center CC; +HLc and −HLc can also be two ratio charts. With reference to FIG. 6, a corresponding relation ratio of Rv and VLc is along the horizontal direction, +VLc and −VLc can be a ratio separated by the calibration center CC; +VLc and −VLc can also be two ratio charts.

The step S106 comprises acquiring a second image from a target by the image device 900, and reading data of pixels 908 of the second image of a corresponding position on the sensor 904 according to an image pixel queue to form a correction image data. The corresponding position is acquired by calculation employing the position-ratio relation charts Rh, Rv.

As described above, the method for correcting a captured image of the present invention uses a calibration procedure to form the expansion/compression ratio between the first image 202 and the reference target 200 to generate a ratio lookup table for calibration parameters serving as parameters for a later instant image process. It should be noted that the above calibration procedure only needs to implement calibration for the image device for one time, for example the calibration is only implemented for one time during a manufacturing process of the image device and then can be adapted for the image device to capture and photograph various objects. Then, in each time acquiring an image, the ratio lookup table of the calibration parameters is used for correction to acquire a correction image for the distorted image, which simplifies a production process, lowers a manufacturing cost, and improves convenience and precision of use.

Figure 7A:
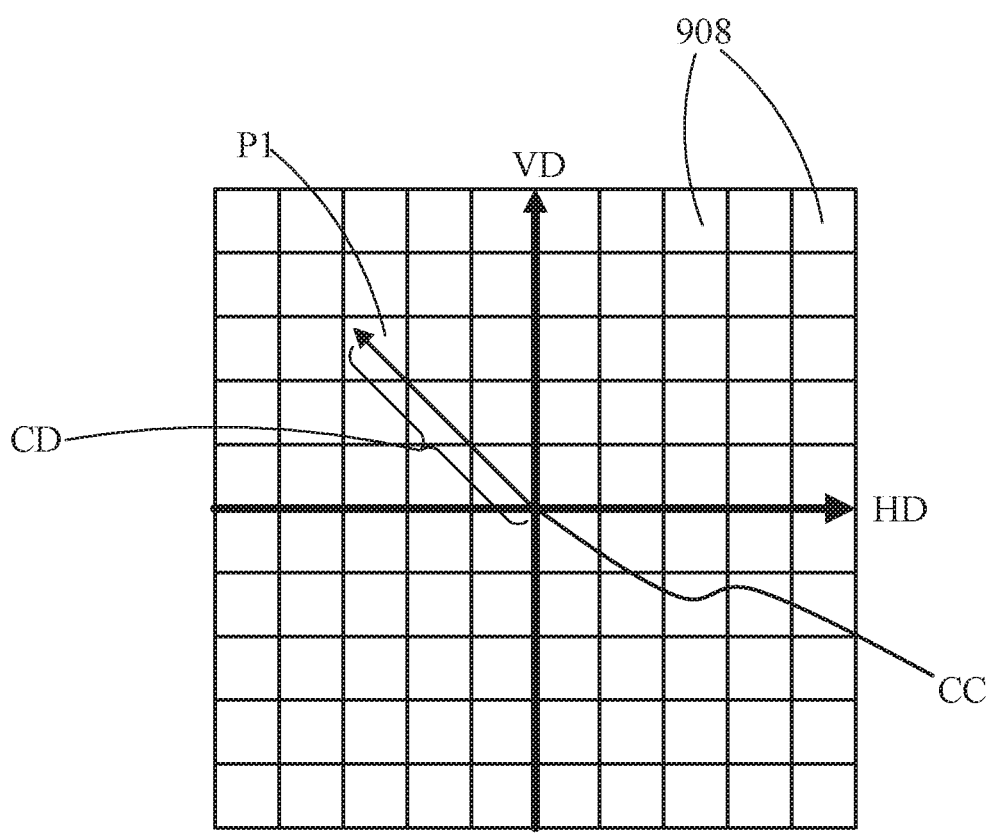
FIG. 7A depicts a schematic view of a plurality of pixels of a sensor of the embodiment of the present invention.
Figure 7B:
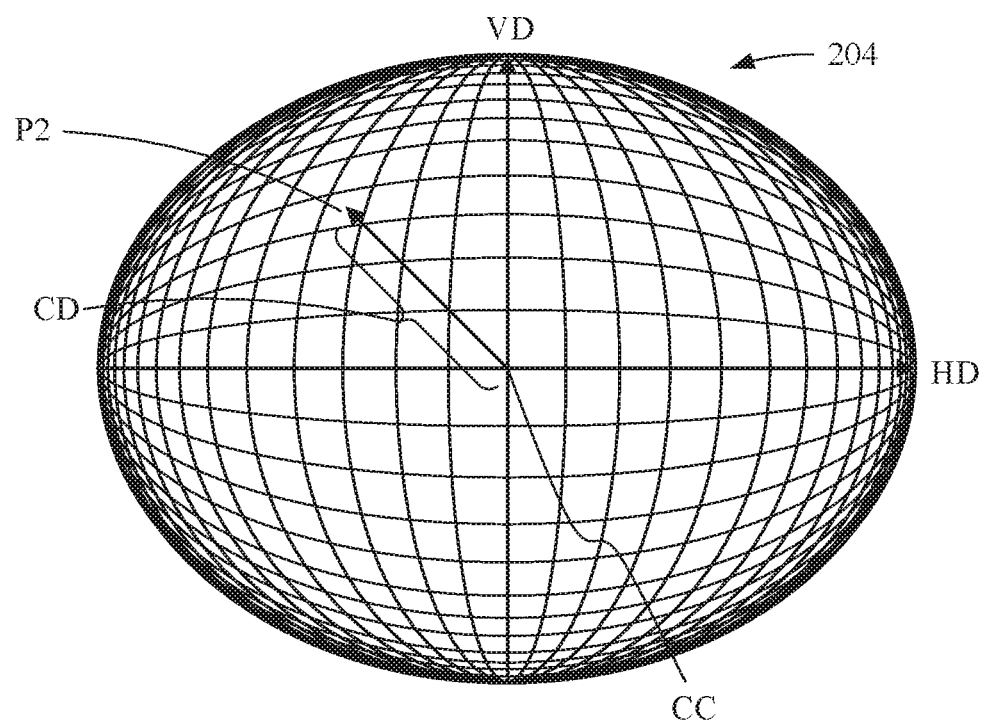
FIG. 7B depicts a schematic view of a second image of a target of the embodiment of the present invention.
Figure 8:
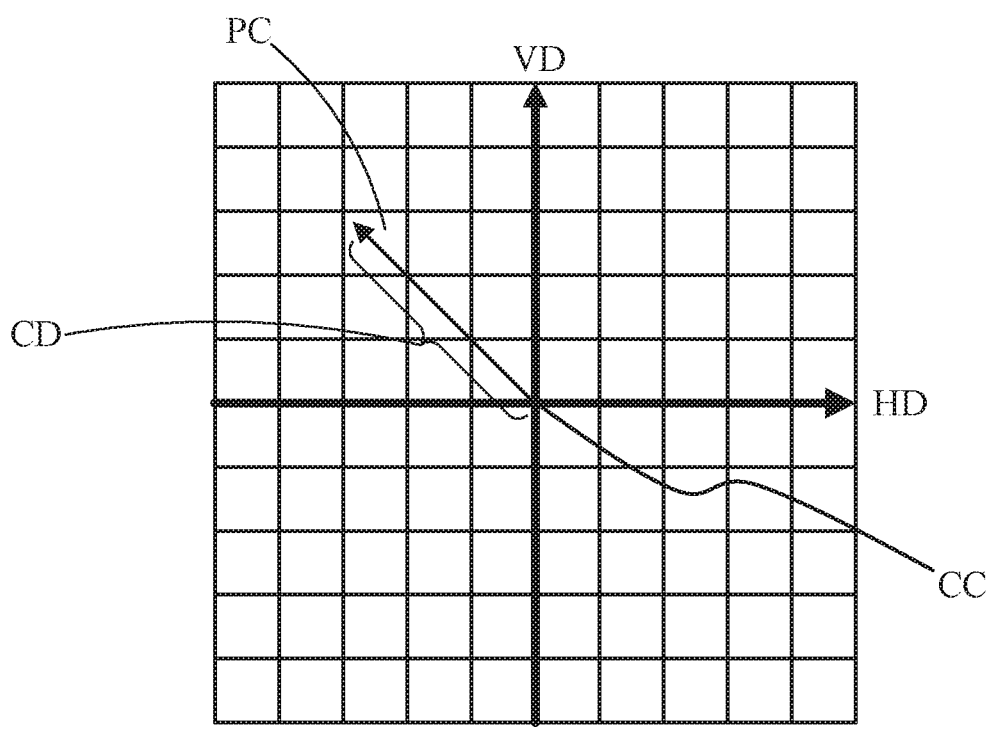
FIG. 8 depicts a schematic view of a correction image of the second image of the embodiment of the present invention.

With reference to FIGS. 2, 7B, and 8, FIG. 2 depicts a block diagram of a image correction device of the embodiment of the present invention. FIG. 7A depicts a schematic view of a plurality of pixels of a sensor of the embodiment of the present invention. FIG. 7B depicts a schematic view of a second image of a target of the embodiment of the present invention. FIG. 8 depicts a schematic view of a correction image of the second image of the embodiment of the present invention. An image correction device comprises an image device 900 and a controller 902. The image device 900 comprises a lens 904 and a sensor 906. The sensor 906 comprises a plurality of pixels 908. The image device 900 comprises an optical axial center. The controller 902 comprises a calculation unit 910 and a memory unit 912. When the image device 900 is in a calibration mode, the image device 900 is configured to acquire a reference target 200 to form a first image 202, the reference target 200 comprises a plurality of reference points MS (also referred as a plurality of object reference points) and a calibration datum point CC, a predetermined distance (also referred as a predetermined length) is defined between each of the reference points MS (also referred as the object reference points of the reference target) and the calibration datum point CC (also referred as the calibration datum point of the reference target), and the controller 902 is configured to calculate out an expansion/compression ratio between the first image 202 and the reference target 200 and establish a position-ratio relation chart Rh, Rv between the first image 202 and the reference target 200 according to the expansion/compression ratio. When the image device 900 is in a correction mode, the image device 900 is configured to acquire a second image 204 from a target, the controller 902 is configured to acquire an image content of each of positions of pixels 908 of the second image 204 according to an image pixel queue and calculate out the expansion/compression ratio of the image content of each of the pixel 908 according to the position-ratio relation chart to establish a correction image of the second image 204.

In FIG. 7A, calibration distances CD of pixels 908 in the sensor 906 of the image device 900 relative to the calibration center CC are calculated by the controller 902, the pixels 908 form an image, the image is a pattern before it is acquired by the image device 900 through a wide-angle lens or a fisheye lens. In other words, the pixels 908 are an non-distorted image and comprises a predetermined resolution, a resolution the non-distorted image corresponds to a second image 204. For example, a positive distance CD of a pixel position P1 is as shown in FIG. 7A. The resolution of the non-distorted image of the pixels 908 can have a different setting.

In FIG. 7B, a second image 204 is acquired by the image device 900, and the second image 204 corresponds to the calibration center CC and comprises a plurality of pixel positions P2. Each of the pixel positions P2 of the second image 204 has each of calibration distances CD corresponding to each of pixels 908, as shown in FIG. 7A. In an embodiment, a unit of the calibration distance CD is a pixel unit. The calibration distance CD between the calibration center CC of the second image 204 and each of the pixel positions P2 is equal to the calibration distance CD between the calibration center CC of the sensor 906 and each of the pixels 908 (i.e., the pixel position P1).

In FIG. 7B, an image content of each of the pixel positions P2 of the second image 204 is acquired by the controller 902 according to the calibration distance CD to serve as an image content of each of the pixels 908 of the sensor 906, as shown in FIG. 7B.

In FIG. 8, the image content the expansion/compression ratio of each of the pixels 908 is calculated out by the controller 902 according to the ratio charts Rh, Rv to establish a correction image of the second image 204. As shown in FIG. 8, the correction image is formed by a plurality of pixel positions PC. In an embodiment, image contents of four or a plurality of adjacent pixels 908 are used for an interpolation step of a correction image.

In an embodiment, the reference target, for example, is a symmetrical scale, and acquires a correction image of the distorted image after calibration and correction processes.

The method for correcting an image and the device thereof of the present invention simply and effectively correct distorted images and lower a cost by the correction controller.

Although the preferred embodiments of the present invention have been disclosed as above, the aforementioned preferred embodiments are not used to limit the present invention. The person of ordinary skill in the art may make various changes and modifications without departing from the spirit and scope of the present invention. Therefore, the scope of protection of the present invention is defined by the scope of the claims.

What is claimed is:

1. A method for correcting a captured image, comprising:
  acquiring a first image from a reference target by an image device, wherein the reference target is a physical object and comprises a plurality of object reference points and a calibration datum point, the calibration datum point is an unique point distinct from the plurality of object reference points; wherein a first predetermined length is between each of the plurality of object reference points and the calibration datum point along a horizontal direction, and a second predetermined length is between each of the plurality of object reference points and the calibration datum point along a vertical direction, wherein the horizontal direction and the vertical direction are orthogonal to each other, and the calibration datum point is on the intersection of the horizontal direction and the vertical direction; wherein the first image comprises a plurality of image reference points and a calibration center; wherein the image device comprises a lens, an optical axial center and a sensor, and the sensor comprises a plurality of pixels, wherein the reference target projects an image to the sensor through the lens, and the first image is acquired on the condition that the optical axial center coincides with the calibration datum point;

identifying the plurality of image reference points and the calibration center in the first image by a controller;

calculating out a first calibration length between each of the plurality of image reference points and the calibration center along the horizontal direction, and a second calibration length between each of the plurality of image reference points and the calibration center along the vertical direction;

calculating out a first expansion/compression ratio by dividing the first calibration length by the first predetermined length, and a second expansion/compression ratio by dividing the second calibration length by the second predetermined length;

establishing a horizontal direction position-ratio relation chart between the first image and the reference target according to the first expansion/compression ratio;

establishing a vertical direction position-ratio relation chart between the first image and the reference target according to the second expansion/compression ratio; and acquiring a second image from a target by the image device, and reading pixel data of the second image of a corresponding position on the sensor according to an image pixel queue to form a correction image data, wherein the corresponding position is acquired by calculation employing the horizontal direction position-ratio relation chart and the vertical direction position-ratio relation chart.

2. The method for correcting a captured image as claimed in claim 1, wherein the reference target comprises a set of orthogonal scales.

3. The method for correcting a captured image as claimed in claim 1, wherein the reference target is a checkerboard.

4. The method for correcting a captured image as claimed in claim 1, wherein the first pattern is a horizontal scale, and the second pattern is a vertical scale.

5. The method for correcting a captured image as claimed in claim 4, wherein the vertical scale intersects the horizontal scale orthogonally.

6. An image correction device, comprising:
an image device comprising a lens, an optical axial center, and a sensor, the sensor comprising a plurality of pixels; and
a controller comprising a calculation unit and a memory unit;

wherein when the image device is in a calibration mode, the image device is configured to acquire a reference target to form a first image, wherein the reference target is a physical object and comprises a plurality of object reference points and a calibration datum point is an unique point distinct from the plurality of object reference points, wherein a first predetermined length is between each of the plurality of object reference points and the calibration datum point along a horizontal direction, and a second predetermined length is between each of the plurality of object reference points and the calibration datum point along a vertical direction, wherein the horizontal direction and the vertical direction are orthogonal to each other, and the calibration datum point is on the intersection of the horizontal direction and the vertical direction, wherein the first image comprises a plurality of image reference points and a calibration center, wherein the reference target projects an image to the sensor through the lens, and the first image is acquired on the condition that the optical axial center coincides with the calibration datum point;

wherein the controller is configured to identify the plurality of image reference points and the calibration center in the first image;

wherein the controller is configured to calculate out a first calibration length between each of the plurality of image reference points and the calibration center along the horizontal direction, and a second calibration length between each of the plurality of image reference points and the calibration center along the vertical direction;

wherein the controller is configured to calculate out a first expansion/compression ratio by dividing the first calibration length by the first predetermined length, and a second expansion/compression ratio by dividing the second calibration length by the second predetermined length;

wherein the controller is configured to establish a horizontal direction position-ratio relation chart between the first image and the reference target according to the first expansion/compression ratio, and establish a vertical direction position-ratio relation chart between the first image and the reference target according to the second expansion/compression ratio;

wherein when the image device is in a correction mode, the image device is configured to acquire a second image from a target, and the controller is configured to acquire an image content of each of pixel positions of the second image according to an image pixel queue and calculate the first expansion/compression ratio and the second expansion/compression of the image content of each of the pixel positions according to the horizontal direction position-ratio relation chart and the vertical direction position-ratio relation chart to establish a correction image of the second image.

7. The image correction device as claimed in claim 6, wherein the reference target comprises a set of orthogonal scales.

8. The image correction device as claimed in claim 6, wherein the reference target is a checkerboard.

9. The image correction device as claimed in claim 6, wherein the first pattern is a horizontal scale, and the second pattern is a vertical scale.

10. The image correction device as claimed in claim 9, wherein the vertical scale intersects the horizontal scale orthogonally.

* * * * *